Patented Sept. 7, 1943

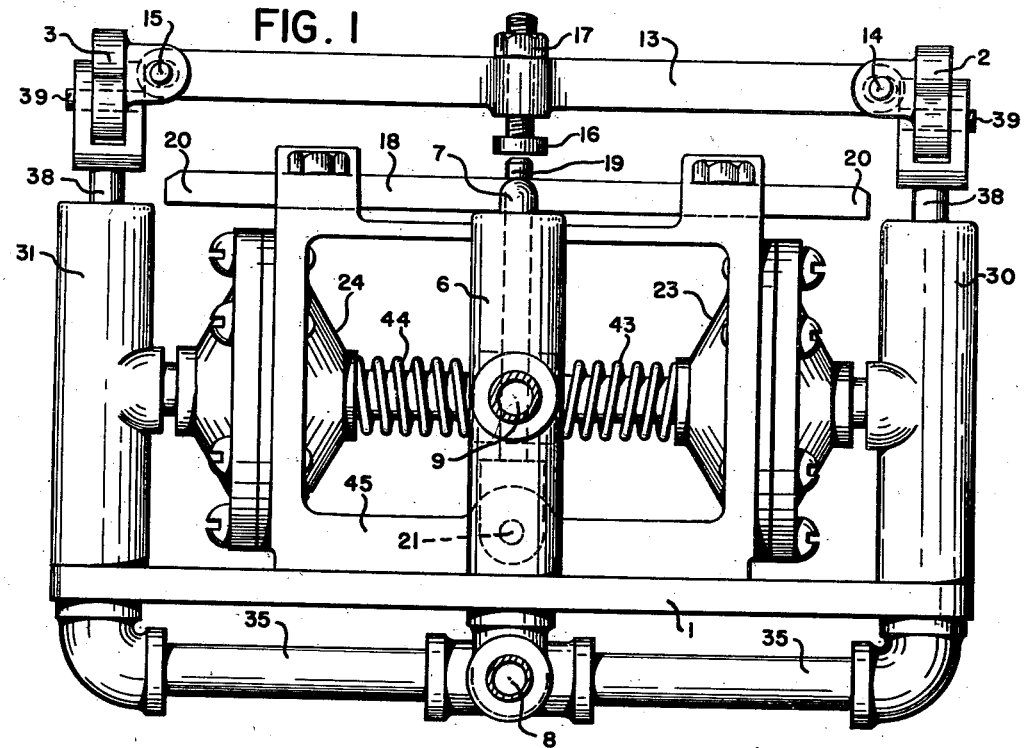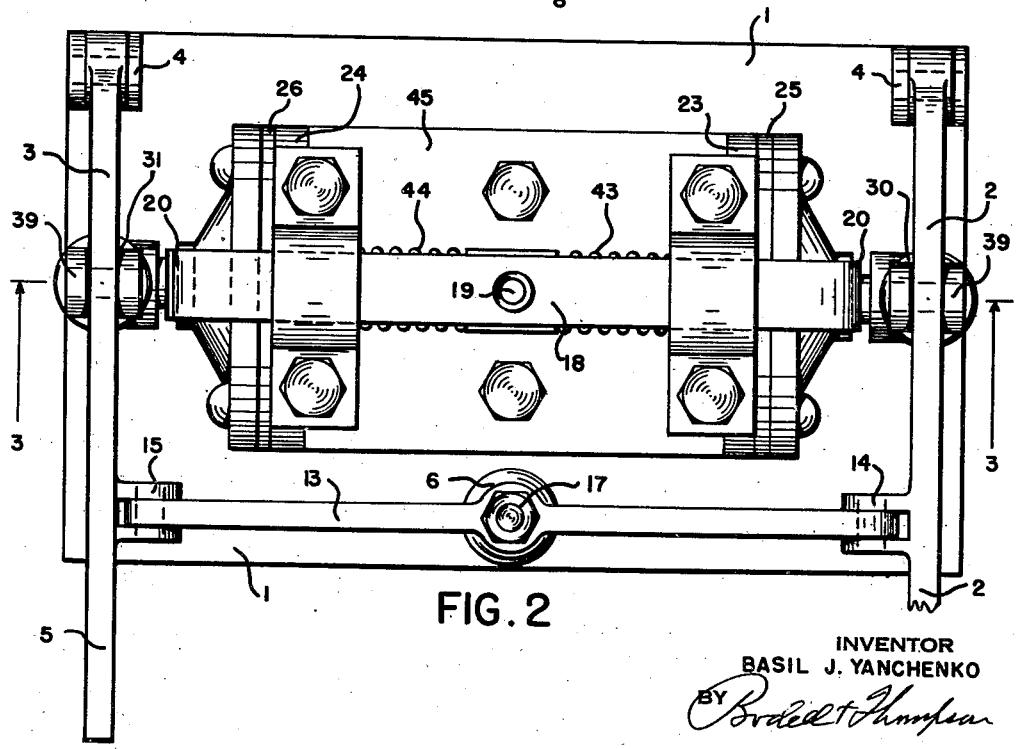

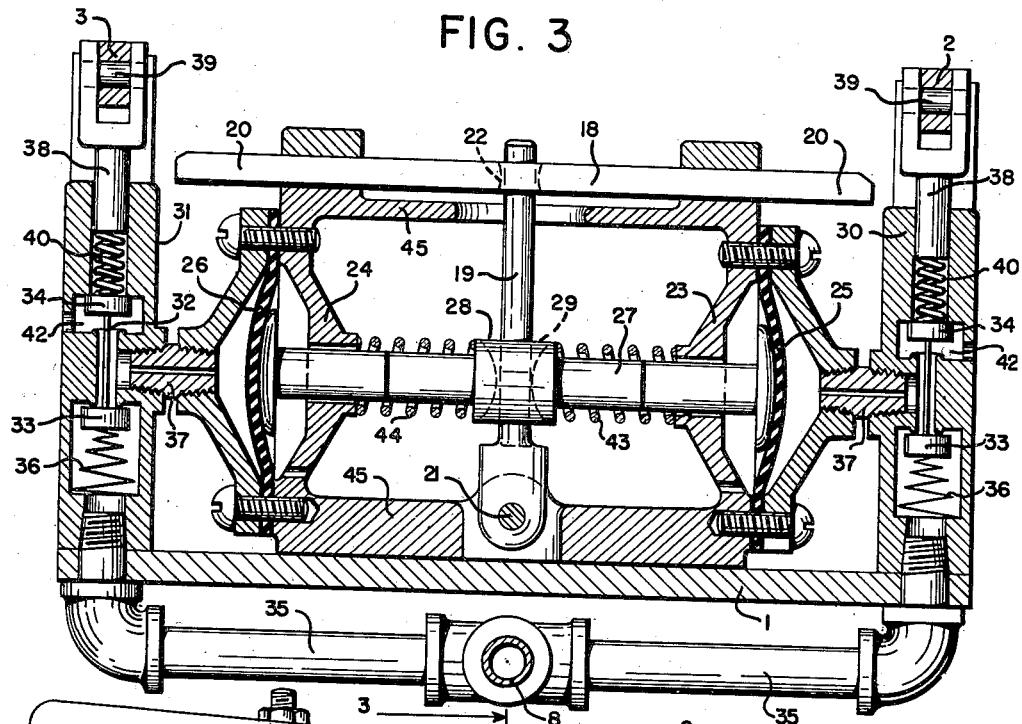
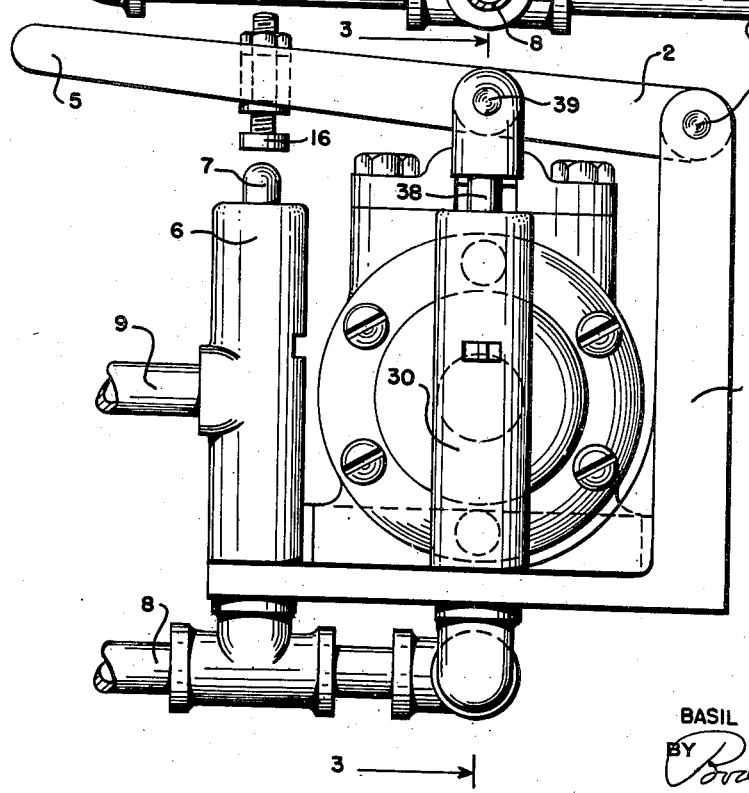

2,328,765

UNITED STATES PATENT OFFICE 2,328,765

TWO-HAND CONTROL

Basil J. Yanchenko, Syracuse, N. Y., assignor to The Prosperity Company, Inc., Syracuse, N. Y., a corporation of New York Application December 12, 1941, Serial No. 422,754

5 Claims. (Cl. 192—131)

This invention relates to two hand controls for power operated machines, the operation of which may be dangerous to the operator, as power presses, punch presses, garment and laundry presses, etc.

The invention has for its object a two hand control in which substantially simultaneous operation of both manuals is required and in which the operation of each manual operates means which controls the effective operation of the other manual, and more specifically, blocking means operating when either manual only is operated to block the effective operation of the other manual.

It further has for its object a shifter for shifting the blocker and controlled by the manuals, and also more specifically a blocker normally arranged in inoperative position, and a shifter therefor normally arranged in central position and shiftable in either direction from central position to shift the blocker upon the operation of either only of the manuals, and to be held in central position by the substantially simultaneous operation of both manuals.

It further has for its object a two hand control including the blocking means or its equivalent controlled by the manuals, and motion transmitting means between the manuals and a control means, as for instance, a valve or valves controlling the flow of power to a machine to be operated, which motion transmitting means includes a differential mechanism, one form being a differential lever, which tilts when only one manual is operated, and hence transmits no motion and which moves rectilinearly without tilting when both manuals are operated in unison, and hence transmits motion to the control means controlling the flow of power to the machine to be operated.

It further has for its object a two hand control which is particularly compact and unitary in construction and readily applied to the situation in which it is to be used.

The invention consists in the novel features and in the combinations and constructions hereinafter set forth and claimed.

In describing this invention, reference is had to the accompanying drawings in which like characters designate corresponding parts in all the views.

Figure 1 is a front elevation of this two hand control unit.

Figure 2 is a plan view thereof.

Figure 3 is a sectional view on line 3—3, Figure 2.

Figure 4 is a side elevation of the control unit.

Figure 5:
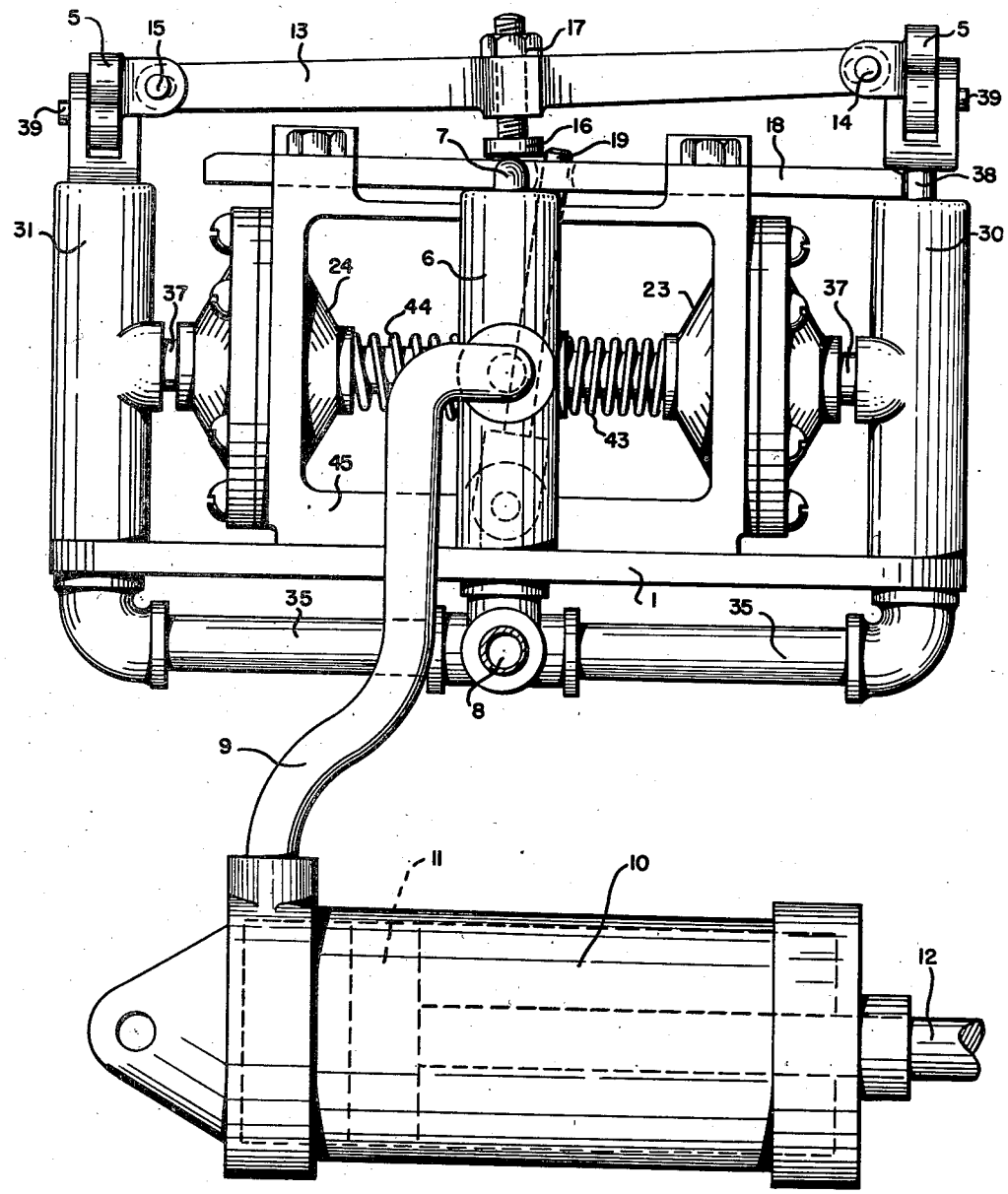
Figure 5 is a view similar to Figure 1, the contiguous part of a motor of the machine to which power is to be supplied being also shown and the parts being shown in the position occupied when only one manual, as the left hand manual, is operated.

1 designates the frame of the unit. 2 and 3 designate respectively the right and left hand manuals, these being shown as levers, each pivoted at one end at 4 to the frame, and as transferring its operating movement from between the pivot 4 and the handle end 5 thereof. The control means is here shown as a single element, although it may be a plural number of elements. 6 designates a control element for controlling the flow of power to the machine to be operated. As in the illustrated embodiment of the invention, the power used is compressed air, the control element 6 is a valve having a movable member therein provided with a stem 7 extending out of the casing of the valve 6. The valve 6 is mounted on the frame 1. The valve controls the flow of power from a main line 8 through a pipe 9 to the motor of the machine to be operated. As seen in Figure 5, this motor may be a cylinder 10 having a piston 11 therein, the rod 12 of which is connected to transmit motion to the movable parts of the machine to be operated. The valve 6 is a two-way or combined intake and exhaust valve having a normally closed valve head and a normally open exhaust valve head. When the valve is operated by the operation of the manuals 2, 3, simultaneously, the exhaust valve head closes and the intake valve head opens. The movable valve member is self-returnable to its normal position in which the intake is closed and the exhaust opened by suitable means, as a spring. This valve is of substantially the same construction as other valves embodied in this two hand control, the construction of which will be presently described.

The motion transmitting mechanism between the manuals 2, 3 and the stem 7 of the movable member of the control valve 6 includes a differential member, here shown as a lever, by which the simultaneous operation of both manuals is required to transmit an operating movement to the stem 7 of the control valve 6. In the illustrated embodiment, this mechanism includes a differential lever or whiffle-tree 13 fulcruming between its ends on the stem 7 and pivotally connected at 14 and 15 to the manual levers 2, 3 respectively. Each of the pivots at 14 and 15 includes a slot through which the pivot extends, to permit play of the lever during the tilting movement thereof about its fulcrum. The motion of the lever is here shown as transferable through a head 16 of a bolt threading through the lever centrally thereof and held in any adjusted position by a nut 17. Obviously, depression of either only of the manual levers 2, 3 will result in tilting of the lever 13 about the pivotal point 14 or 15 adjacent the other manual lever, and movement of both manual levers 2, 3 in unison effects a vertical rectilinear movement of the lever 13, causing the head 16 to depress the stem 7 of the control valve 6.

The means operable by either manual for controlling the effective operation of the other manual operates, in the illustrated exemplification of the invention, to disable or block the operation of the other manual, when the manuals are not operated simultaneously, but remains in neutral or inoperative when both manuals are operated substantially simultaneously. This means comprises a blocking member 18 normally arranged in idle or neutral position, a shifter 19 connected to the blocking member and normally arranged in central position and shiftable in opposite directions from central position, and actuating devices controlled respectively by the manuals and acting oppositely on the shifter 19 with equal force when both manuals are operated simultaneously and one only acting thereon, and thereby shifting the shifter out of central position when either only of the manuals is operated.

The blocking member 18 is here shown as a bar or bolt slidably mounted on a support carried by the frame 1 and having its ends 20 normally arranged out of the path of the manual levers 2, 3 and one or the other of the ends being shiftable into the path of one of the levers when only one manual is operated. The shifter 19 is here shown as a rock arm pivoted at 21 to a support carried by the frame, and having its free end extending into an opening 22 in the blocking bar 18 so that swinging of the shifter 19 about the pivot 21 shifts the blocking bar 18 in one direction or the other.

The actuating devices for the shifter 19, in this embodiment of the invention, is shown as pressure or air operated, as the motive fluid used for the operation of the machine is compressed air.

23 and 24 designate, respectively, the pressure operated devices, these being for convenience diaphragm chambers having diaphragms 25, 26 therein acting on opposite ends of a double ended plunger 27 which has a head 28 between its ends formed with a passage 29 through which the shifter arm 19 extends. The diaphragm chambers are arranged on opposite sides of the shifter 19 and the diaphragms through the double plunger 27 act oppositely on the shifter 19. The flow of pressure fluid or air to the pressure sides of the diaphragm chambers is controlled by control members or valves operated by the manuals 2, 3 respectively.

30, 31 designate the valves which are two-way or combined intake and exhaust valves. Each of these valves comprises a suitable casing, a valve member 32 therein having a normally closed intake valve head 33 and a normally open exhaust valve head 34 connected together by a stem to act as a unit. The intake or lower end of the valve casing is connected by a pipe 35 to the main air line 8 in parallel with the control valve 6. The valve member 32 of each of these valves 30, 31 is self-closing as by a spring 36. The valves are mounted on the frame 1 adjacent the diaphragm chambers 23, 24 respectively and are connected thereto by couplings 37. The valve members 32 are operated by the manual levers 2, 3 respectively through suitable parts, as a plunger 38 pivoted at 39 to the manual lever 2 or 3 and extending axially into bores in the casing of the valve 30 or 31. The plungers thrust against the movable valve members of the valves 30, 31 preferably through yielding means, as springs 40, interposed between the ends of the plungers and the exhaust valve heads 34.

In operation, if both manuals 2, 3 are operated substantially simultaneously or in unison, the valve members 32 of both valves 30, 31 will be operated to open the intake heads 33 and close the exhaust valve heads 34, permitting the air to enter the casing of the valves 30, 31 from the main line 8 and thence through the couplings 37 into the pressure sides of the diaphragm chambers 24 and thus act equally on the diaphragms 25, 26, so that the shifter 19, and hence the blocking bar 18, remains in central position. The simultaneous operation of the manual levers causes the differential lever 13 to move rectilinearly downwardly and depress the stem 7 of the control valve 6 to open this control valve and permit air to pass from the main line 8 through the casing of the valve 6 and through the pipe 9 to the cylinder 10 of the machine to be operated. The release of the levers permits the exhaust of air from the cylinder 10 back through the pipe 9, valve casing 31, and out through the exhaust passage 41 of the valve 6. Also, the release of the manual levers 2, 3 permits the exhaust of air from the diaphragm chambers out through the exhaust ports 42 of the valves 30, 31 and the closing of the intake valve head 33 and opening of the exhaust valve head 34. The valve 6 is of substantially the same construction as the valves 30, 31. When only one manual is operated, as for instance, as seen in Figure 5, where only the left hand manual 3 is shown as operated, the movable valve member 32 of the left hand valve 31 only is operated, so that only the diaphragm 26 in the diaphragm chamber 24 is energized, thus causing the shifter to be shifted to the right, as seen in Figure 5, and operating the blocking bar 18 into position to block the subsequent operation of the right hand manual 2. Such operation of only one of the manual levers causes a tilting of the differential lever 13, as seen in Figure 5, without sufficient movement to operate the valve 6. Upon the release of one manual lever, as the lever 3, that is operated, the parts return to their normal position, so that the machine may be then operated by depressing both levers 2, 3 substantially simultaneously. The movement of the double plunger 27 is against the action of returning springs 43, 44 acting oppositely on the plunger 27 and tending to return the plunger to central position. These springs are normally of substantially the same strength but when only one is compressed by the operation of one manual, its force is sufficient to return the shifter 19 to central position.

All the parts of this device are mounted as a unit on the frame 1 in juxtaposition to each other. The manual levers 2, 3 are pivoted to the frame. The diaphragm chambers 23, 24 are mounted on a support 45 mountable on the frame 1. The shifter 19 is pivoted to, and the blocking bar 18 is slidably mounted on, this support 45. The control valves 6, 30 and 31 mounted on the frame 1 and also the couplings for connecting the valves 6, 30 and 31 to the main air line 8 are carried by the frame 1. Thus, the two hand control may be applied as a unit to the machine to be controlled thereby.

By this two hand control, it is impossible to operate a machine with one manual only or by tying down one manual. The operation of one manual only disables the operation of the other manual and the actuating movement of both manuals through a differential mechanism effects the opening of the control valve or other control member for the machine to be operated and prevents the opening of the control valve by the operation of but one manual.

What I claim is:

1. A two hand control including a pair of manuals, control means for controlling the flow of power to operate a machine, means controlled by the manuals, when operated simultaneously, for effecting the operation of the control means, blocking means normally out of blocking position and operable by each manual when operated individually into position to block the effective operation of the other manual, the last means including a blocking member, a shifter normally arranged in central position and movable laterally in opposite directions from central position and connected to the blocking member to shift the same in one direction or the other, a pair of power operated devices acting equally in opposite directions on the shifter, and controls for the power to said devices operated respectively by the manuals.

2. A two hand control including a pair of manuals, control means for controlling the flow of power to operate a machine, means controlled by the manuals, when operated simultaneously, for effecting the operation of the control means, blocking means normally out of blocking position and operable by each manual when operated individually into position to block the effective operation of the other manual, the last means including a blocking member, a shifter normally arranged in central position and movable laterally in opposite directions from central position and connected to the blocking member to shift the same in one direction or the other, a pair of pressure operated devices acting equally in opposite directions on the shifter, and valves for controlling the flow of pressure fluid to said devices operated respectively by the manuals.

3. A two hand control including a pair of manuals, control means for controlling the flow of power to operate a machine, means controlled by the manuals for effecting the operation of the control means including a differential element connected to the manuals to be operated thereby, and motion transmitting means operated by the differential element to operate the control means, a blocking member normally arranged in neutral position and shiftable into position to block the operation of either of the manuals, a shifter connected to the blocking member normally arranged in central position and shiftable in opposite directions from central position, and power operated devices paired with the manuals and controlled respectively thereby and acting when energized oppositely with equal force on the shifter, whereby upon the operation of either manual only the shifter is shifted from central position and shifts the blocker into position to block the operation of the other manual, and simultaneous operation of both manuals is required to hold the shifter in central position.

4. A two hand control including a pair of manuals, a main line for a motive fluid, valve means for controlling the flow of the fluid to operate a machine, operable by the substantially simultaneous operation of the manuals, means operable by each manual for controlling the effective operation of the other manual including shiftable mechanism and a pair of pressure operated motors acting, when energized, oppositely and equally on said mechanism and connected in the main line, and valves operated respectively by the manuals and located to control the flow of motive fluid to said motors respectively.

5. A two hand control including a pair of manuals, a main line for a motive fluid, valve means for controlling the flow of the fluid to operate a machine, operable by the substantially simultaneous operation of the manuals, a blocking member normally arranged in central position and shiftable in different directions from central position into position to block one or the other of the manuals, a shifter therefor, a pair of pressure operated motors acting, when energized, oppositely and equally in opposite directions on the shifter, conduits connecting the motors to the main line and valves operated respectively by the manuals in said conduits.

BASIL J. YANCHENKO.